United States Patent [19]
Weller

[11] 3,774,950
[45] Nov. 27, 1973

[54] ENERGY ABSORBING BUMPER ASSEMBLY
[75] Inventor: Peter A. Weller, Dover, N.H.
[73] Assignee: McCord Corporation, Detroit, Mich.
[22] Filed: July 1, 1971
[21] Appl. No.: 158,814

[52] U.S. Cl. .................................. 293/84, 293/88
[51] Int. Cl. ........................................ B60r 19/08
[58] Field of Search.................. 114/219; 267/139, 267/140, 21 R, 21 A; 293/74, 84, 87, 88, 89

[56] References Cited
UNITED STATES PATENTS

| | | | |
|---|---|---|---|
| 1,435,100 | 11/1922 | Bilterman et al. | 293/84 |
| 1,576,728 | 3/1926 | Dominguez | 293/84 |
| 1,412,047 | 4/1922 | Dyer | 293/84 X |
| 1,416,468 | 5/1922 | Hoffman | 293/74 X |
| 1,457,331 | 6/1923 | Wharton | 293/84 |
| 1,729,731 | 10/1929 | Vidach | 293/89 |

Primary Examiner—Gerald M. Forlenza
Assistant Examiner—Robert Saifer
Attorney—Barnard, McGlynn & Reising

[57] ABSTRACT

An energy absorbing bumper assembly which includes a bumper means and a pair of connecting links connected to the bumper means at the first ends thereof and converging toward one another in the direction of the second ends thereof. Various support means extend from the second ends of the connecting links and are connected or attached to the frame of a vehicle. Energy absorbing means are included to allow the second ends of the connecting links to move apart and together as the bumper means moves toward and away from the frame. In a number of embodiments, the connecting means are attached to the frame by first and second pairs of support links which are normally disposed in generally parallel relationship with one another. In these embodiments, the connecting links interconnect each pair of support links and the bumper means and move the support links toward and away from one another in response to movement of the bumper means. Various means are utilized in these embodiments for resisting relative movement between the support links to absorb energy as the bumper means moves rearwardly. In yet another embodiment, each pair of connecting links are attached to the vehicle frame by support links which are each pivotally connected to the vehicle frame and have arms extending from the pivotal connection with a connecting link connected to each arm. The energy absorbing means is disposed between one arm of each support link and the vehicle frame.

5 Claims, 10 Drawing Figures

PATENTED NOV 27 1973

INVENTOR.
Peter A. Weller
BY
Barnard, McGlynn & Reising
ATTORNEYS

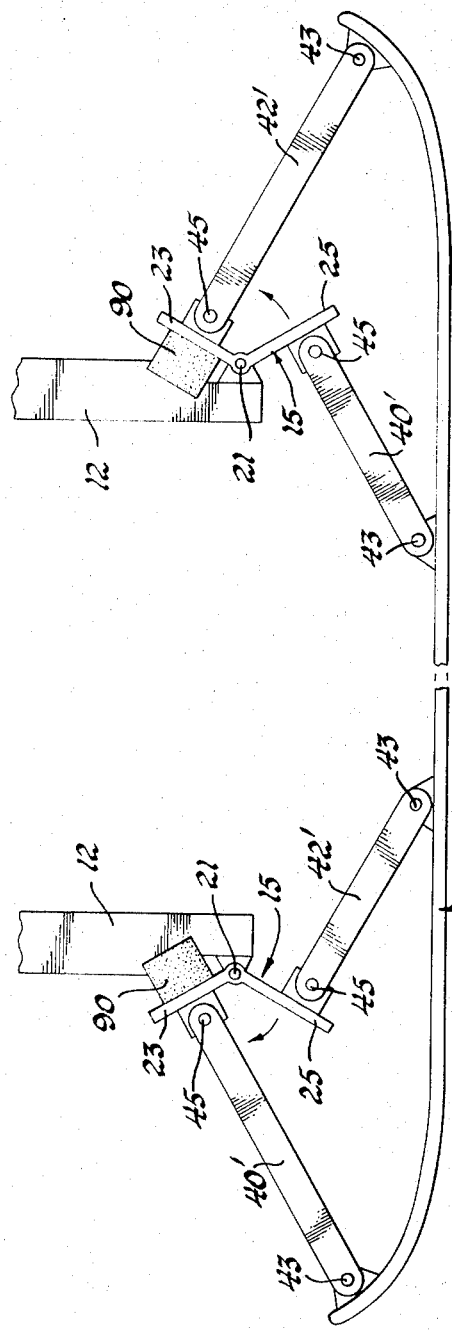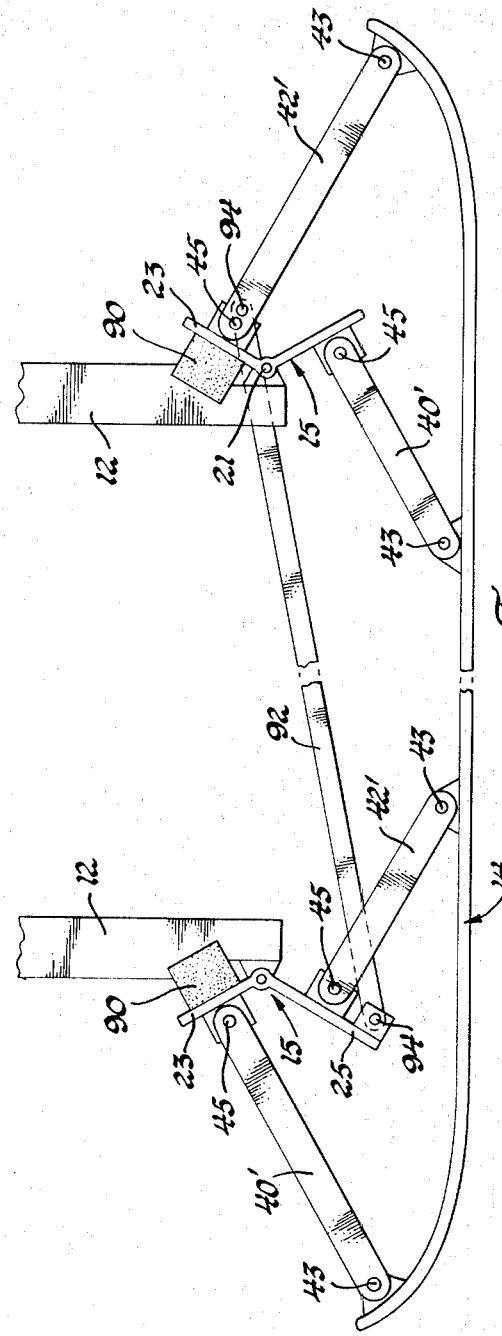

ENERGY ABSORBING BUMPER ASSEMBLY

This invention relates to an energy absorbing bumper assembly of the type which may be utilized in automobiles for absorbing energy in the event the automobile is involved in a crash and makes contact through the bumper. As the prior art shows there have been many developments in energy absorbing bumper assemblies in an attempt to make automobiles safer. Examples of such assemblies are shown in the following U.S. Pats. Nos.: 1,435,100; 1,755,007; 1,777,342; 1,792,157; 1,810,502; 1,812,417 and 3,311,397.

Generally speaking, the various prior art assemblies are structured so that they require specific energy absorbing means or require the energy absorbing means to be placed in a particular position relative to the other components.

It is an object and feature of this invention to provide an improved energy absorbing bumper assembly including a generic structural feature of mechanism which allows various different energy absorbing concepts and devices to be used therewith.

In correlation with the foregoing object and feature, it is another object and feature of this invention to provide an energy absorbing bumper assembly which includes a bumper means and a pair of connecting links connected to the bumper means at first ends thereof with each pair converging toward one another in the direction of the second ends thereof with the support means extending from the second ends of the connecting links and adapted to be attached to the frame of a vehicle and including energy absorbing means to allow the second ends of the connecting links to move apart and together as bumper means move toward and away from the frame.

Another object and feature of this invention is to provide an energy absorbing bumper assembly which includes at least one pair of support links adapted for attachment to the frame of a vehicle and normally disposed in spaced generally parallel relationship and connected to a bumper means through connecting means which will move the support links relative to one another upon movement of the bumper means and with which various energy absorbing means may be employed.

Other objects and attendant advantages of the present invention will be readily appreciated as the same becomes better understood by reference to the following detailed description when considered in connection with the accompanying drawings wherein:

FIG. 6 is a fragmentary plan view of a further embodiment; and

FIG. 7 is a plan view similar to FIG. 6 but showing a slight modification of the embodiment of FIG. 6.

All of the embodiments are adapted to be attached to the frame of a vehicle, which frame includes the frame members 12. All of the embodiments also include a bumper means as generally indicated at 14.

Figure 2:
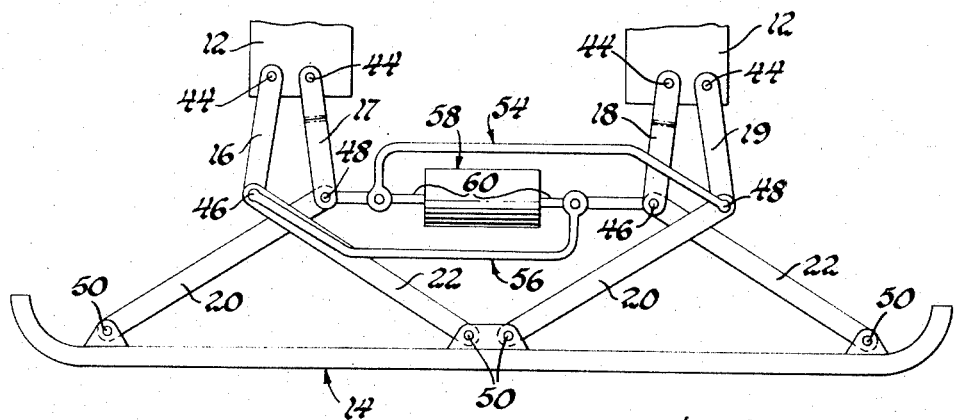
FIG. 2 is a plan view of the embodiment of FIG. 1 but showing the components in a collapsed position.
Figure 3:
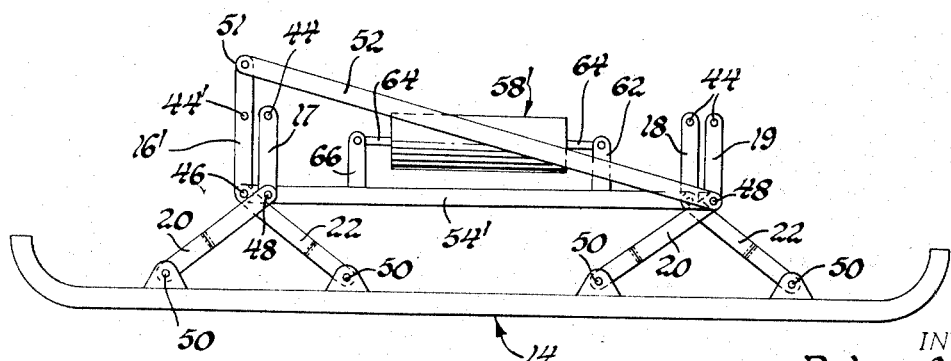
FIG. 3 is a plan view of a second embodiment.
Figure 4:
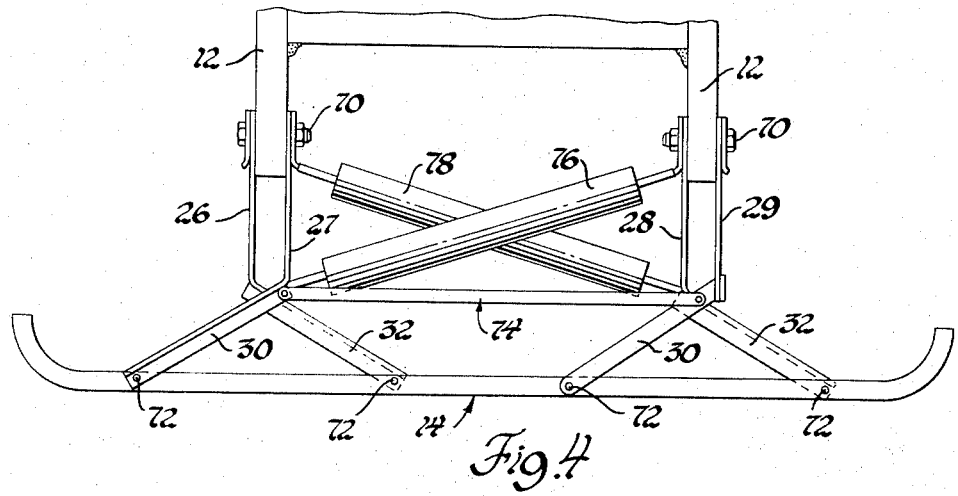
FIG. 4 is a plan view of yet another embodiment.
Figure 5:
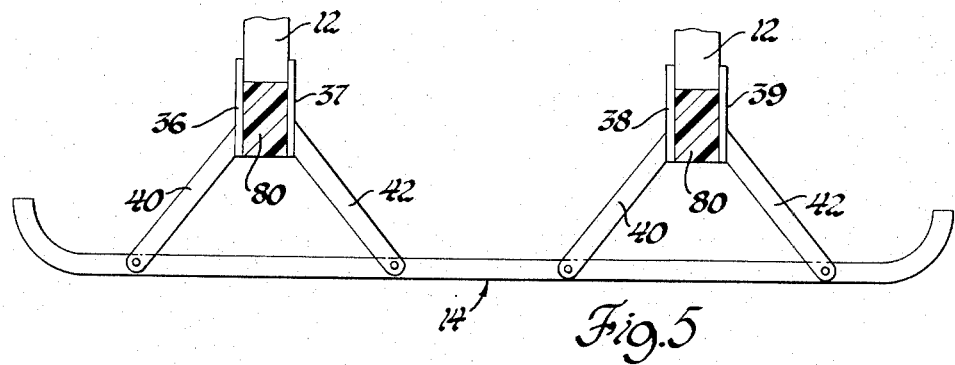
FIG. 5 is a plan view of still another embodiment.

The embodiments of FIGS. 1 through 5 all include first and second pairs of support links adapted for attachment to the frame members 12 and normally disposed in spaced generally parallel relationship to one another. The first pair of such support links are shown at 16 and 17 in the embodiment of FIGS. 1 and 2 and the second pair are shown at 18 and 19. Similar pairs of support links are utilized in the embodiment of FIG. 3 except for the support link 16' which is modified and slightly different from the support link 16 in the embodiment of FIGS. 1 and 2, the reason for which will be more fully explained hereinafter. The first pair of support links in the embodiment of FIG. 4 are shown at 26 and 27 and the second pair are shown at 28 and 29. The first pair of support links in the embodiment of FIG. 5 are shown at 36 and 37 and the second pair are shown at 38 and 39. In the variations shown in FIGS. 5a through 5c, only the first pair of support links are shown at 36 and 37.

The support links described above define support means for attaching the assembly to a frame and such support means in the embodiment of FIGS. 6 and 7 include a pair of support links each of which is generally indicated at 15. Each support link 15 is pivotally connected to the frame member 12 by a pivotal connection 21. Each support link 15 includes first and second arms 23 and 25 which extend radially from the pivotal connection 21 and which are disposed at an angle relative to one another of less than 180°.

The energy absorbing bumper assembly of the instant invention also includes connecting means.

The connecting means of the embodiments of FIGS. 1 through 5 interconnect the support links and the bumper means 14 for moving the support links toward and away from one another in response to movement of the bumper means. The connecting means in the embodiments of FIGS. 1 and 3 comprise the connecting links 20 and 22. The connecting means in the embodiment of FIG. 4 comprises the connecting links 30 and 32. The connecting means in the embodiment of FIG. 5 and the variations of FIGS. 5a through 5c comprises the connecting links 40 and 42. Thus, as clearly shown in the drawings, a connecting link extends between each support link and the bumper means 14. Also, the connecting links extending from each pair of support links diverge from one another as they approach the bumper means.

The connecting means in the embodiment of FIGS. 6 and 7 comprise the first and second pairs of connecting links 40' and 42'. The connecting links 40' and 42' are pivotally connected at the first ends thereof to the bumper means 14, as indicated by the pins 43. A first connecting link 40' of each pair of connecting links is connected by a pivot 45 to the first arm 23 of the associated support link 15. The second connecting link 42' of each pair of connecting links is connected by a similar pivot 45 to the second arm 25 of the associated support link 15.

As the specific description of each embodiment proceeds it will be clear that the invention includes various energy absorbing means for resisting relative movement between the support links.

Figure 1:
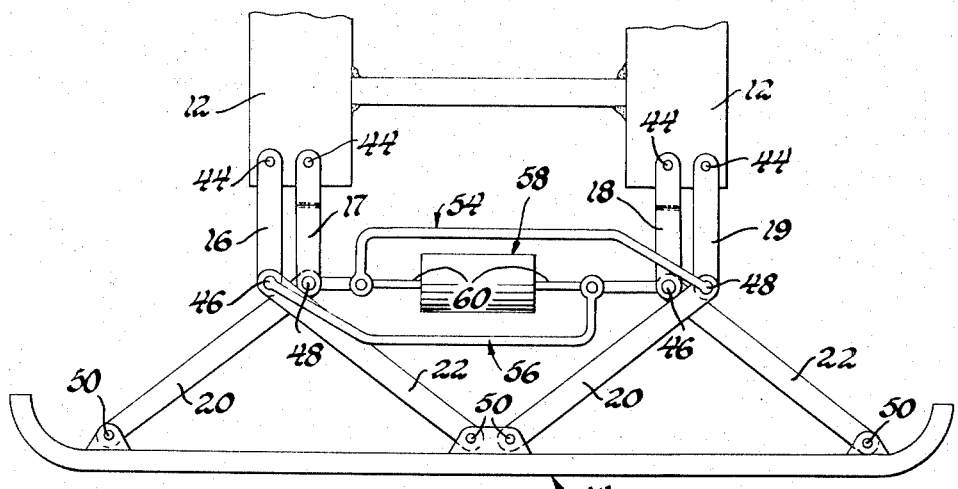
FIG. 1 is a plan view of a first embodiment of the instant invention.

In the embodiments of FIGS. 1 and 3, the support links 16, 16', 17, 18 and 19 are adapted for pivotal connection, as indicated at 44 and 44', to the frame members 12. The support links are pivotally connected at opposite ends thereof to the connecting links 20 and 22 as indicated by the pivotal connections 46 and 48. The connecting links 20 and 22 are pivotally connected at the opposite ends thereof to the bumper means 14, as indicated at the pivotal connections 50. Also, the connecting links 20 and 22 are disposed so that each diverging pair cross one another. In other words, the connecting links 20 and 22 connected to the first pair of support links 16 and 17 cross one another as do the connecting links 20 and 22 connected to the second pair of support links 18 and 19.

The embodiment of FIG. 3 differs from the embodiment of FIGS. 1 and 2 mainly by including a support link 16' which extends to a distal end 51 disposed beyond the position of the link which is adapted at 44' for pivotal attachment to the frame 12 and by including a bar 52 pivotally interconnecting the distal end 51 of the link 16' and the pivotal connection 48 between the oppositely disposed support link 19 of the other pair and its associated connecting link 20.

Both of the embodiments of FIGS. 1 and 3 include similar energy absorbing means for resisting relative movement of the support links.

The energy absorbing means of the embodiment of FIGS. 1 and 2 includes a first rod means, generally indicated at 54, interconnecting a first two similarly disposed support links 17 and 19 and a second rod means, generally indicated at 56, which interconnects the second two similarly disposed support links 16 and 18 so that the similarly disposed support links of the two respective pairs move in unison. The energy absorbing means also includes a shock absorber, dampener, or a like device, generally indicated at 58, for resisting movement of the first and second rod means 54 and 56. As illustrated, the shock absorber 58 includes the shafts 60 extending into the ends thereof and attached to the respective rod means 54 and 56 and which move into the shock absorber 58 upon movement of the bumper means 14 toward the frame members 12, as under impact conditions. The shock absorber 58 may be a hydraulic dampener including a cylinder and pistons or may contain resilient material or may be an oleo-type strut, or various equivalent devices.

In the embodiment of FIG. 3, a first rod means 54' interconnects the similarly disposed support links 17 and 19 as by being connected to the pivotal connections 48 and includes an upwardly projecting extension 62 which attaches to a rod 64 extending into a shock absorber 58'. Disposed directly behind the first rod means 54' is a second rod means (not shown) from which projects the extension 66 to be connected to the other shaft 64 of the shock absorber 58' and which second rod means interconnects the two similarly disposed support links 16' and 18 by being connected to the pivotal connections 46 thereof to the connecting links 22.

The shock absorber 58' in the embodiment of FIG. 3 resists movement of the bumper means 14 toward the frame means in a similar manner as the shock absorber 58 in the embodiment of FIGS. 1 and 2. The bar 52 in the embodiment of FIG. 3 restrains the linkage so that the bumper means 14 moves in a parallel fashion rearwardly in the event a force is applied only to one side of the bumper means 14 or in the event a force is applied at an angle to the bumper means 14, as being applied in a sidewise fashion at one end of the bumper means.

Turning now to the embodiments of FIGS. 4 and 5, the support links 26, 27, 28 and 29 and the support links 36, 37, 38 and 39 are adapted and are shown rigidly attached to the frame members 12. In the embodiment of FIG. 4, the support links 26, 27, 28 and 29 are rigidly attached to the frame members 12 by the bolts 70. The support links 36, 37, 38 and 39 in the embodiment of FIG. 5 are preferably welded or similarly rigidly attached to the frame members 12.

Referring now specifically to the embodiment of FIG. 4, the support links 26, 27, 28 and 29 are resilient and are rigidly attached to the connecting links 30 and 32 as by being welded thereto or by forming an integral part thereof. It will be noted that each pair of diverging connecting links 30 and 32 cross one another adjacent each pair of support links. The connecting links 30 and 32 are pivotally connected to the bumper means 14 as by the pivot pins 72. A first rod means, as generally indicated at 74, interconnects a first two similarly disposed support links 27 and 29. Although in the embodiment of FIG. 4 only one such rod means 74 is illustrated, it will be appreciated that a second rod means may be utilized to interconnect the second two similarly disposed support links 26 and 28.

The embodiment of FIG. 4 also includes a first energy absorbing means 76 connected to one (support link 27) of the first two similarly disposed support links 27 and 29 and is adapted and is attached at the other end to the frame 12 by the bolt 70. There is also included a second energy absorbing means 78 connected to one (support link 28) of the second two similarly disposed support links 26 and 28 and adapted at the other end for attachment to the frame member 12 by the bolt 70. The energy absorbing means 76 and 78 may take many forms including hydraulic dampeners, oleo struts, etc.

In the embodiment of FIG. 4, the support links 26, 27, 28 and 29 are preferably resilient and flexible and/or yieldable as by being made of spring steel so as to act as shock absorbing or energy absorbing components. Alternatively, or in addition, the energy absorbing devices 76 and 78 may be utilized. The support links 26, 27, 28 and 29 may be of heavy spring steel capable of full energy absorption with dampening being provided by energy absorbing devices 76 and 78. The support links 26 through 29 may be also formed of a lamination of very light spring steel and a plastic such as urethane whereby absorption and dampening are combined.

Figure 5A:
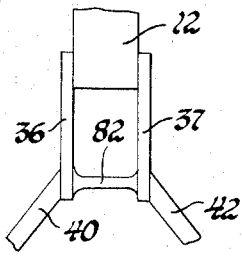
FIGS. 5a through 5c are fragmentary plan views showing variations of the embodiment of the energy absorbing bumper assembly shown in FIG. 5 and constructed in accordance with the instant invention.
Figure 5B:
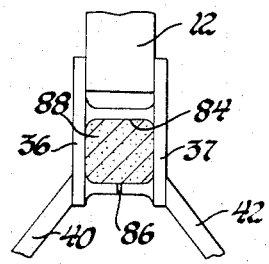
Figure 5C:
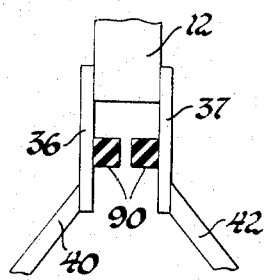

Turning now to the embodiment of FIG. 5 and the variations thereof disclosed in FIGS. 5a through 5c, various energy absorbing means are disposed between the pairs of support links 36 and 37 and 38 and 39 for resisting movement of the support links of each pair toward one another. As illustrated in FIG. 5, the energy absorbing means includes a block of resilient material 80 which extends between and interconnects the support links of each pair. The material 80 may be of various compositions but is preferably of a plastic material such as polyurethane.

In the variation shown in FIG. 5a, the energy absorbing means comprises one or more collapsible columns, one of which is indicated at 82. Upon forces being applied through the connecting links 40 and 42, the support links 36 and 37 move together but the movement toward one another is resisted by the collapsing column 82.

In the variation illustrated in FIG. 5b, an enclosed chamber 84 is disposed between the support links 36 and 37 and the chamber includes a bleed hole 86. A medium 88 is disposed in the chamber 84 and is forced out through the bleed hole 86 upon movement of the support links 36 and 37 toward one another. The material 88 in the chamber 84 may comprise air or a particulate material.

In the variation shown in FIG. 5c, the energy absorbing means includes resilient pads 90 secured to each support link 36 and 38 with the pads secured to each pair of support links being spaced from one another and extending toward one another so that the pads have to move a distance toward one another before engaging one another to absorb the energy transferred to the support links through the connecting links 40 and 42.

Turning now to the embodiment of FIGS. 6 and 7, an energy absorbing means is defined by a yieldable block 90 of material such as plastic, or the like. The block of yieldable or resilient material 90 is disposed between the arm 23 of each support link 15 and the vehicle frame member 12. Preferably, the blocks 90 are attached as by an adhesive or the like to the arm 23 of each support link 15. It will be noted that as the bumper means 14 moves rearwardly toward the frame members 12, the support links 15 will pivot in opposite directions as indicated by the arrows in FIG. 6 to compress the blocks 90. In other words, the support links 15 are oppositely disposed for pivoting about the respective pivotal connections 21 thereof in opposite directions.

FIG. 7 shows a slight variation of the embodiment of FIG. 6 by including the rod means 92 which is pivotally connected at 94 to the arm 25 of one support link and is pivotally connected at the other end at 94 to the connecting link 42' of the opposite pair. The rod means 92 operatively interconnects one link, 42' of one pair of connecting links and the associated support link 15, to one link (the support link 15) of the other pair of connecting links and the associated support link for moving the connecting links of each pair in unison. In other words, the rod means 92 may interconnect the two sets of links in various combinations to assure that the two sets of links move in unison as the bumper means 14 moves rearwardly toward the vehicle frame 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An energy absorbing bumper assembly comprising: bumper means; support means including first and second arms forming a crank and being adapted to be pivotally connected to the frame of an automobile; a pair of connecting links connected to said bumper means at first ends thereof and converging toward one another in the direction of second ends thereof, one of said connecting links being pivotally connected at the second end thereof to one of said first and second arms of said crank and the other link being pivotally connected at the second end thereof to the other of said first and second arms such that upon impact of said bumper means, force is transmitted through said connecting links to said arms, thus causing said crank to pivot; and energy absorbing means disposed between one of said arms of said support means and said frame such that when said support means pivots upon impact, the energy of said impact is absorbed.

2. An assembly according to claim 1, including a second support means with first and second arms and a pair of connecting links connected to said arms.

3. An assembly according to claim 2, including rod means operatively interconnecting at least one link of one pair of connecting links to at least one link of the other pair of connecting links for moving said connecting links in unison.

4. An assembly according to claim 1, wherein said energy absorbing means includes yieldable means for disposition between an arm of each support link and the vehicle frame.

5. An assembly according to claim 4, wherein said energy absorbing means comprises blocks of resilient energy absorbing material which is adapted to be compressed between said support links and said frame.

* * * * *